United States Patent
Bartsch et al.

(10) Patent No.: US 6,604,496 B2
(45) Date of Patent: Aug. 12, 2003

(54) LONGITUDINALLY ADJUSTABLE CONNECTING ROD

(75) Inventors: Guenter Bartsch, Zuelpich (DE); Jens Linsel, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/099,504

(22) Filed: Mar. 18, 2002

(65) Prior Publication Data

US 2002/0129778 A1 Sep. 19, 2002

(30) Foreign Application Priority Data

Mar. 19, 2001 (DE) .......................... 011 06 804

(51) Int. Cl.[7] ................................ F02B 75/04
(52) U.S. Cl. ................... 123/78; 74/586; 74/579
(58) Field of Search ............... 123/78, 48; 74/579, 74/586

(56) References Cited

U.S. PATENT DOCUMENTS

| 2,245,778 | A | | 6/1941 | Handke | |
|---|---|---|---|---|---|
| 4,195,601 | A | | 4/1980 | Crise | |
| 5,146,879 | A | * | 9/1992 | Kume et al. | 123/48 B |
| 5,724,863 | A | * | 3/1998 | Kramer et al. | 74/583 |
| 6,394,047 | B1 | * | 5/2002 | Rao et al. | 123/48 B |
| 6,467,373 | B1 | * | 10/2002 | El Tahry et al. | 74/579 |

FOREIGN PATENT DOCUMENTS

| DE | 965741 | 6/1957 |
|---|---|---|
| JP | 11294210 | 4/1998 |

* cited by examiner

Primary Examiner—Tony M. Argenbright
Assistant Examiner—Katrina B. Harris

(57) ABSTRACT

The invention relates to a longitudinally adjustable connecting rod (1), in which a piston part (2) and a shaft part (9) are telescopically inserted one inside the other. Piston part and shaft part can be locked together at certain lengths by pins (5a, 5a', 5b, 5b') supported in the piston part skirt (8), which engage in associated recesses (4a, 4a', 4b, 4b') on the shaft part skirt (3). Every two pins (5a, 5a'; 5b, 5b') are pushed apart by springs (11a, 11b) situated between them. Through corresponding feed ducts (7a) a hydraulic medium can be purposely delivered to the recesses in the piston part skirt (3), in order to push pins situated therein back into the shaft part skirt (8).

13 Claims, 3 Drawing Sheets

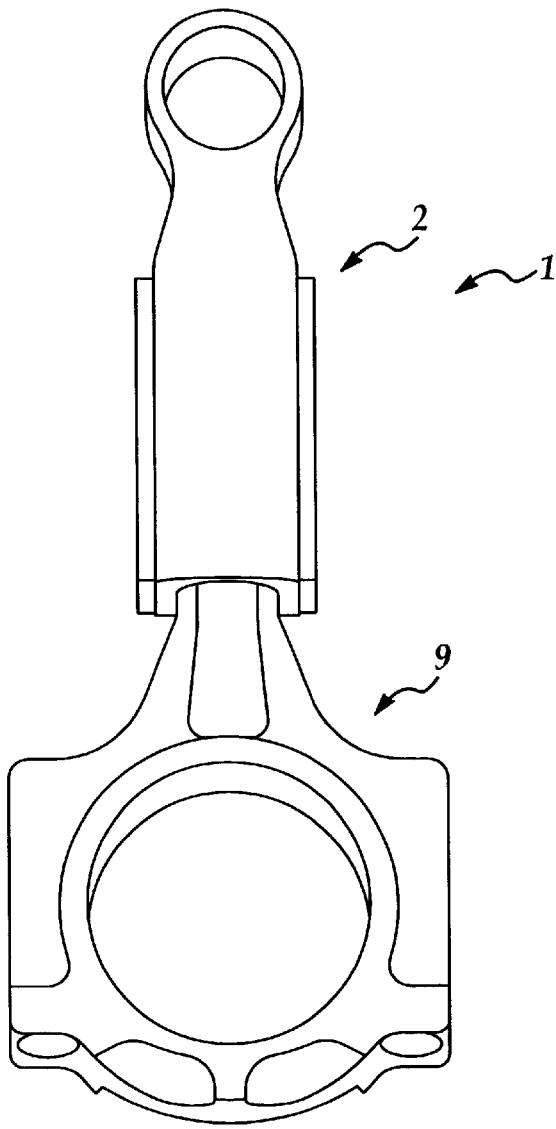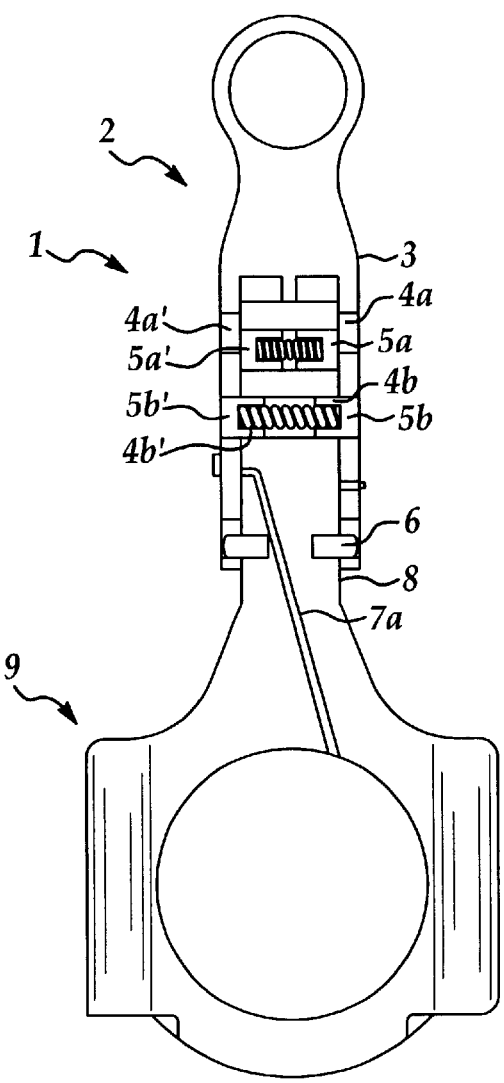
*Figure 1*
*Figure 2*

LONGITUDINALLY ADJUSTABLE CONNECTING ROD

The invention relates to a longitudinally adjustable connecting rod, comprising a piston part to be attached to the piston of an internal combustion engine and having a piston part skirt, and a shaft part to be attached to the crankshaft of the internal combustion engine and having a shaft part skirt, the piston part skirt and the shaft part skirt being telescopically connected together.

BACKGROUND OF THE INVENTION

Connecting rods serve to convert the vertically reciprocating movement of the piston of an internal combustion engine into a rotational movement of the crankshaft. For this purpose they have an upper end with a first eye, which is supported on a transverse axis in the piston, and a lower end with a second eye, which is supported about the crank pin of a crankshaft. Conventional connecting rods have a fixed length, so that a specific combustion chamber volume, defined by the piston in the cylinder, is associated with each angular position of the crankshaft.

With longitudinally adjustable connecting rods on the other hand, the distance between the attachment to the piston and the attachment to the crankshaft can be adjusted, so that the correlation between the crankshaft angle and the combustion chamber volume can be varied. The longitudinal adjustment is used, in particular, to adjust the engine compression ratio according to the operating conditions.

DESCRIPTION OF THE PRIOR ART

A longitudinally adjustable connecting rod of the type referred to in the introductory part is disclosed by U.S. Pat. No. 4,195,601. It comprises a piston part, which is attached to the piston of the internal combustion engine, and a shaft part, which is supported about the crank pin of the crankshaft. The two parts each have skirts extending in the axial direction of the connecting rod, which are telescopically connected together. By means of an expensive structure of intermeshing sleeves, pins and rings, chambers are formed between the piston part and the shaft part, the volume of which chambers varies according to the expansion of the telescopic connection. A part of the chambers can be subjected to pressure by way of ducts for a hydraulic medium running through the crankshaft and the shaft part. An extension or shortening of the telescopic connection can be achieved according to the level of said pressure in relation to the pressure acting on the piston in the combustion chamber. The disadvantage with this system is that relatively high pressures of the hydraulic medium must be applied in order to move the connecting rod. A fixing of the position of the connecting rod is achieved by closing the ducts for the hydraulic medium. This, however, places the hydraulic system under a high static pressure, which places correspondingly high demands on the seals.

U.S. Pat. No. 4,140,091 also discloses a similar system. Here too, a longitudinal adjustment of the connecting rod is produced by the application of a hydraulic pressure, the connecting rod being designed according to the principle of a piston rod in a cylinder.

WO 95/08705 furthermore discloses a longitudinally adjustable connecting rod, in which the upper end of the connecting rod is attached to the piston by way of an eccentrically supported disk. A rod connected to the disk, to the piston and to the connecting rod furthermore causes the eccentric disk to rotate as a function of the crankshaft angle. In this system, therefore, there is a fixed relationship between the crankshaft angle and the effective length of the connecting rod. It is not possible to adjust the connecting rod as a function of the operating condition of the engine.

SUMMARY OF THE INVENTION

Against this background, it was the object of the invention to provide a connecting rod of adjustable length, having a simplified construction and greater operating reliability. This object is achieved by a connecting rod having the features of claim 1. Advantageous developments are contained in the subordinate claims.

The connecting rod accordingly comprises a piston part, which is to be attached so that it can perform a (swivel) movement to the piston of an internal combustion engine, and which has a piston part skirt extending in an axial direction of the connecting rod. It furthermore comprises a shaft part, which is to be rotatably attached to the crankshaft or the crank pin of the crankshaft of the internal combustion engine and has a shaft part skirt extending in an axial direction of the connecting rod. The piston part skirt and the shaft part skirt are telescopically connected together, so that a longitudinal adjustment of the connecting rod can be achieved through shortening or extension of said telescopic connection.

The connecting rod is distinguished that an arresting device is provided, by means of which the piston part skirt and the shaft part skirt can be mechanically arrested in at least two different positions relative to one another. Arresting the piston part skirt and the shaft part skirt in relation to one another produces a mechanical connection, which absorbs the large axial forces acting on the connecting rod. This has the advantage that these forces no longer lead to a high static pressure in a hydraulic medium, the back-pressure and density of which are bound to ensure a constant connecting rod length. Accordingly there is no need to provide particularly pressure-resistant hydraulic chambers and seals, which are expensive to manufacture. Furthermore, the use of arresting devices has the advantage that these can be operated more flexibly, so that an adjustment of the length of the connecting rod is not just possible solely at crankshaft angles predetermined by the design.

DESCRIPTION OF THE PREFERRED EMBODIMENTS

The telescopic connection between the piston part and the shaft part is preferably achieved in that one of the skirts, particularly the piston part skirt, comprises an axially extending guide chamber, in which the second skirt (shaft part skirt) is displaceably supported. The second skirt therefore constitutes a type of piston rod, which is supported in the guide chamber of the first skirt. The cross section of the guide chamber may be circular or angular, especially rectangular. The design of the telescopic connection explained has the advantage firstly that it is easy to manufacture, and secondly that it is particularly stable and functionally reliable.

According to a preferred development of the invention, the arresting device comprises at least one pin which is supported in the piston part skirt or in the shaft part skirt so that it is displaceable transversely to the skirt axis. In this case, the pin is displaceable between a locking position and an unlocked position, the pin in the locking position engaging in a recess on the other skirt, whilst in the unlocked position it does not engage in said recess. In the locking position the pin forms a coupling between the two skirts, so that the facility of the skirts for axial displacement is canceled. All forces acting on the connecting rod in an axial direction are transmitted from one skirt to the other by way of the pin. The necessary stability of this coupling can be assured through a corresponding design of the pin and its guides. Supporting the pin transversely to the skirt axis has the advantage that it does not have to be displaced in opposition to the loads acting in an axial direction of the connecting rod. The pin can therefore be shifted between the locking position and the unlocked position by applying relatively small forces.

In the last-mentioned development, the pins are preferably preloaded into one of their two possible positions by an elastic element or a spring. This is preferably the locking position. Preloading by means of a spring means that for external movement of the pin, force has only to be exerted in one direction. In the opposite direction, on the other hand, the motive force is applied by the spring, which can be compactly arranged directly on the pin. Preloading, especially into the locking position, has the advantage that the connecting rod tends to assume a stable condition at the arrested length. This increases the reliability of the system in response to faults in the externally acting adjustment mechanism for the pins.

According to a further development of the arresting device with pins and recesses, the piston part skirt or the shaft part skirt has at least one bore extending transversely to the skirt axis and in which two pins are supported, so that they can each emerge in opposing directions from one end of the bore. This arrangement has the advantage that an interlock is achieved between the skirts of piston part and shaft part, which is symmetrical in relation to the axis of the connecting rod, so that force is transmitted uniformly.

In the last-mentioned arrangement a spring, which pushes the pins apart, can be situated between the two pins. The spring therefore tends to push the pins in a direction out of the bore and into a recess in the other skirt, that is to say into the locking position.

Electrical or hydraulic devices are preferably provided, which are capable of moving the pins from the locking position into the unlocked position. The arresting mechanism can therefore be canceled through actuation of these devices, in order to adjust the length of the connecting rod. A movement of the pins in the opposite direction, that is to say from the unlocked position into the locking position, can likewise be performed by said electrical or hydraulic devices, or the pins may be preloaded by a spring acting in this direction, as referred to above.

For accomplishing a hydraulic actuation of the arresting device, preferably at least one feed duct for a hydraulic medium is provided in the shaft part, the feed duct being in fluid connection with a recess when piston part and shaft part are in a relative position such that a pin of the piston part engages or is capable of engaging in said recess. In the following, it will be assumed without restriction of universality that the recess is arranged in the piston part and the pin in the shaft part. When the pin of the shaft part skirt engages in the recess, an interlock exists between the piston part skirt and the shaft part skirt. This interlock may be canceled through the connection of the feed duct to the recess, by delivering hydraulic medium (fluid or gas) under pressure by way of the feed duct, so that a corresponding pressure is built up in the recess. This pressure in the recess acts on the pin located there and forces it to move out of the recess, that is to say into its unlocked position. As soon as the pin has fully left the recess, the interlock between the skirts is canceled, and the length of the piston rod can be adjusted.

According to a further development of the invention, the piston part and the shaft part may have bearing surfaces, which are designed and arranged so that they are in contact and transmit forces in an axial direction, when the piston part and the shaft part assume a lockable relative position. This has the advantage that the forces to be transmitted in an axial direction of the connecting rod do not have to be transmitted from the piston part to the shaft part solely by the arresting device, said bearing surfaces instead assuming a considerable part of the load in this case. Accordingly, the arresting device may be of a lighter and simpler design.

DESCRIPTION OF THE DRAWINGS

The invention is exemplified below with the aid of the figures, of which:

FIG. 1 shows a perspective view of a longitudinally adjustable connecting rod;

FIG. 2 shows a cross section through the connecting rod;

FIG. 1 represents a perspective view of a piston rod 1 according to the invention. It can be seen that the piston rod comprises a piston part 2 and a shaft part 9, which are telescopically inserted one inside the other with their skirts opposing. The piston part 2 situated at the top in FIG. 1 may in a known manner be swivel-mounted on the piston (not shown) of an internal combustion engine, and the lower shaft part 9 rotatably mounted on the crank pin of a crankshaft. By adjusting the length of the connecting rod, it is possible to influence the compression ratio in the combustion chamber of the internal combustion engine, so that the latter can be optimally adjusted to the prevailing operating conditions of the engine. The two-part design of the connecting rod at the same time has the advantage that the upper and lower connecting rod bearings can be of conventional design, so that the connecting rod can be used in the usual production and assembly process. The shift mechanism formed in the skirt of the connecting rod for adjustment and arresting of the length enables the distance between the upper and lower connecting rod bearings to be varied between at least two positions, the compact and fully integrated construction permitting a fully external function test.

In FIGS. 2 to 6 part of the front cover plate 14 of the piston part 2 has been omitted or drawn transparently, so as to make the arresting device for locking the connecting rod in various positions easier to see. In the exemplary embodiment shown, the connecting rod can be arrested with two different lengths. For this purpose the shaft part skirt 8 has two axially spaced transverse bores, two pins 5a and 5a' being arranged in the upper transverse bore and two pins 5b and 5b' in the lower transverse bore, laterally inverted in relation to one another. At least one spring 11a and 11b respectively (FIG. 6) is situated between the pins of each pair, the spring pushing the pins apart in opposite directions. Under the spring action, the pins tend to emerge laterally from the shaft part skirt 8. This emergence is only possible, however, if one of the recesses 4a, 4a', 4b, 4b' formed in the piston part skirt 3 is situated opposite the pin.

Figure 3:
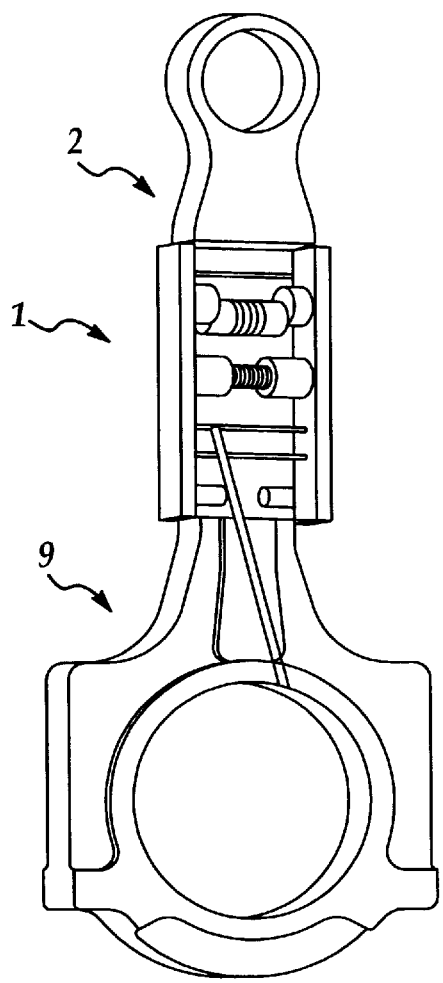
FIG. 3 shows a lateral perspective view of the connecting rod with some parts removed, to reveal the arresting device.

The figures (FIG. 2, for example) represent the situation in which the lower recesses 4b, 4b' are situated axially on a level with the lower pins 5b, 5b', so that these pins can be pushed forward into the recesses under the action of the springs 11b. This advancement of the pins 5b, 5b' makes a connection between the recesses 4b, 4b' and the bore in the shaft part skirt 8, which locks the shaft part 9 to the piston part 2 at the set length.

With the connecting rod locked in the longer position, as shown in the figures, the upper pair of pins 5a, 5a' is not in engagement with the associated recesses 4a, 4a' on the piston part skirt 3. Rather the pins 5a, 5a' are pushed into the shaft part skirt 8 under the compressive action of the spring 11a, that is to say they are in their unlocked position.

For adjusting the length of (in the figures, shortening) the connecting rod 1 it is necessary to move the lower pair of pins 5b, 5b' into their unlocked position. To do this, the pins 5b, 5b' must be withdrawn from the recesses 4b, 4b' into the shaft part skirt 8, whereupon the shaft part 9, utilizing existing gas forces or centrifugal forces, for example, is pushed deeper into the piston part 2, until the upper pair of pins 5a, 5a' is on a level with the upper recesses 4a, 4a' and the pins 5a, 5a' are pushed into said recesses under the action of the spring 11a. Once the pins have been pushed into the recesses, the connecting rod is arrested in its shortened position, until the pins 5a, 5a' are again withdrawn from the recesses 4a, 4a' through an active actuation and the process described above is reversed.

The pins 5a, 5a' and 5b, 5b' respectively can be moved from the advanced locking position into the retracted unlocked position by electrical devices, for example. The figures, however, show a hydraulic actuation, in which a fluid (gas or liquid) is purposely delivered at increased pressure to the upper recesses 4a, 4a' and the lower recesses 4b, 4b' respectively, so that the pins 5a, 5a' or 5b, 5b' that may be situated in said recesses are pushed back into their unlocked position by this pressure. As can be seen, in particular, from FIG. 4, for this purpose two feed ducts 7a, 7b are provided in the shaft part skirt 8, the ducts being connected to an annular groove on the crank pin of the crankshaft (not shown). A hydraulic medium at predetermined pressure can therefore be delivered to the feed ducts 7a, 7b by way of corresponding feed lines in the crankshaft.

Figure 4:
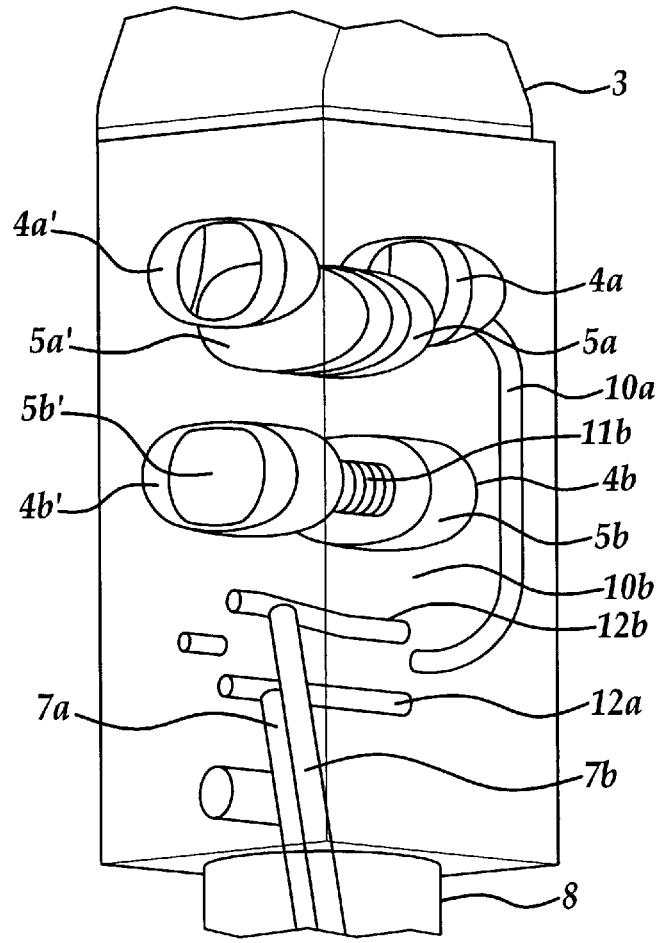
FIG. 4 shows an enlarged perspective and partially transparent view of the arresting device.
Figure 5:
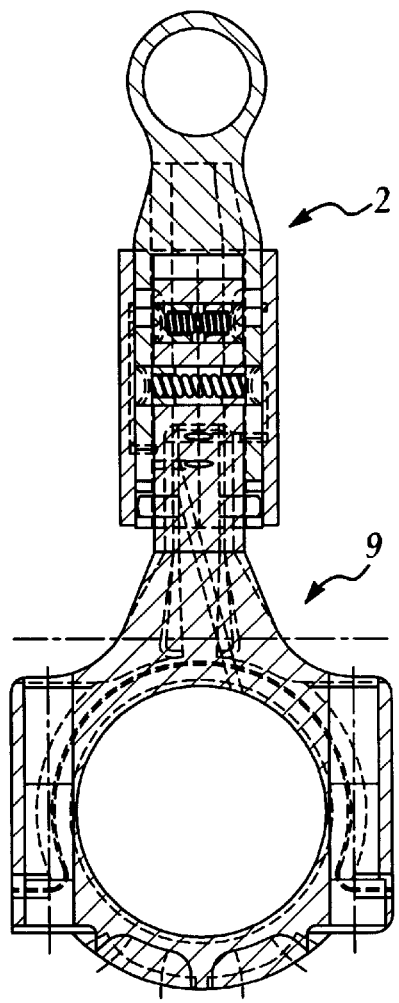
FIG. 5 shows a top view of the connecting rod.
Figure 6:
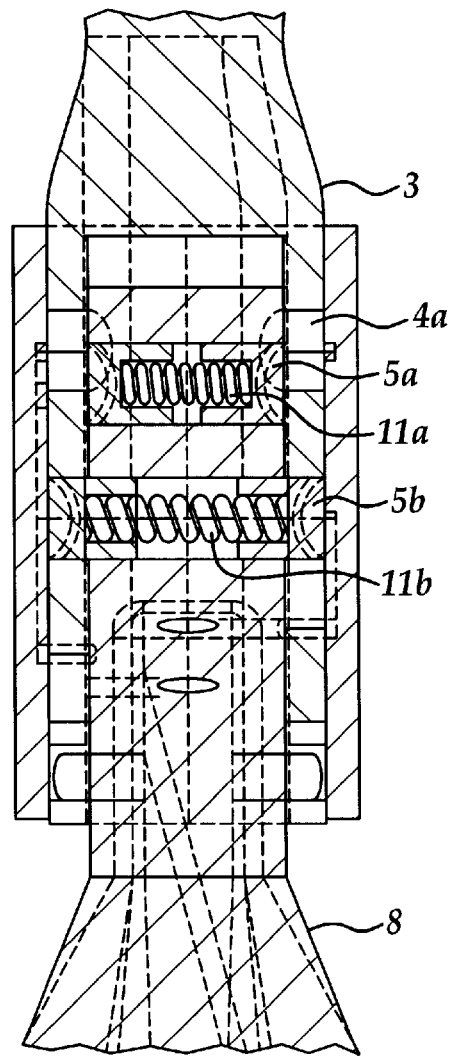
FIG. 6 shows an enlarged top view of the arresting device of the connecting rod.

As can also be seen in particular from FIG. 4, the end of the feed duct 7b is connected to a transverse bore 12b in the shaft part skirt 8, which carries the hydraulic medium delivered outward to both sides of the shaft part skirt. The right-hand outlet opening of this transverse bore 12b in FIG. 4 is situated on a level with the inlet opening of the duct 10b, which is formed in the piston part shaft 3 and leads to the lower recess 4b. Laterally inverted in relation to this, a duct 10b' (not shown) leads from the other end of the transverse bore 12b to the recess 4b'. The hydraulic medium can therefore be delivered by way of the duct 12b to the recesses 4b, 4b', where it can exert pressure on the pins 5b, 5b', in order to force these back into their unlocked position.

After unlocking of the lower pins 5b, 5b', the piston part 2 can move downward during shortening of the connecting rod, until the upper pins 5a, 5a' come on to a level with the associated recesses 4a, 4a'. As soon as this level is reached, the upper pins 5a, 5a', under the action of the spring 11a, emerge from the shaft part skirt 8 and engage in the upper recesses 4a, 4a'. As a result piston part 2 and shaft part 9 are locked to one another in the shortened position.

As can be seen from FIG. 4, in the event of a relative displacement between the piston part skirt 3 and the shaft part skirt 8, the connection between the transverse bore 12b and the duct 10b is interrupted. Hydraulic fluid therefore no longer impinges on the lower recesses 4b, 4b'. On reaching the shortened, lockable position, however, the transverse bore 12a of the second feed duct 7a comes to lie on a level with the inlet of the duct 10a, which is formed in the wall of the piston part skirt 3 and leads to the upper recess 5a. In this case, therefore, hydraulic medium can be delivered under pressure by way of the second feed duct 7a, the transverse bore 12a and the connecting duct 10a to the upper recesses 4a, 4a', as a result of which the pins 5a, 5a' situated there can be forced back into their unlocked position.

The pressurized actuation of the arresting mechanism shown is therefore achieved by way of one or more feed ducts having integral distribution passages, which according to the shift position expose the ducts required. When only one feed bore is being used, a safeguard must be provided to prevent premature return of the system.

In order that the axial forces that have to be transmitted by the connecting rod 1 from the piston part 2 to the shaft part 9 need not all be transmitted by way of the pins 5a, 5a' and 5b, 5b' respectively, bearing surfaces 6 (FIG. 2) may be provided. Such bearing surfaces are formed on the piston part 2 on the one hand and on the shaft part 9 on the other, and come into contact when the parts are in the lockable positions, so that force can be reliably transmitted by way of these fixedly arranged surfaces. Furthermore, as a safeguard against accidental separation of piston part 2 and shaft part 9, these are preferably provided with corresponding safety devices.

What is claimed is:

1. A length-adjustable connecting rod for an internal combustion engine, said connecting rod extending along an axis, said connecting rod comprising:

a piston part being coupled to a piston of said engine;

a shaft part being slidably coupled to said piston part, said shaft part being further coupled to an engine crankshaft; and, a locking device configured to lock said piston part in at least two axial positions relative to said shaft part.

2. The connecting rod of claim 1 wherein said piston part includes an axially extending guide chamber in which a portion of said shaft part is displaceably supported.

3. The connecting rod of claim 1 wherein said locking device comprises at least one pin which is supported in said shaft part, said pin being displaceable transversely to said axis between a locking position where said pin engages a recess in said piston part and an unlocked position where said pin does not engage in said recess.

4. The connecting rod of claim 3 wherein said pin is preloaded by a spring toward said locking position.

5. The connecting rod of claim 3 wherein said pin can be moved from said locking position into the unlocked position by electrical or hydraulic forces.

6. The connecting rod of claim 3 wherein said shaft part includes at least one feed duct connected to said recess in the piston part, said feed duct supplying fluid to said recess to move said pin to an unlocked position.

7. A length-adjustable connecting rod for an internal combustion engine, said connecting rod extending along an axis, said connecting rod comprising:

a first part configured to be coupled to a piston of said engine;

a second part having a first end telescopically coupled to said first part, said second part including a second end configured to be coupled to an engine crankshaft; and, a locking device configured to lock said first part in at least two axial positions along said axis.

8. A length-adjustable connecting rod for an internal combustion engine, said connecting rod extending along an axis, said connecting rod comprising:
- a first part configured to be coupled to a piston of said engine;
- a second part having a first end slidably coupled in a guide chamber of said first part, said second part including a second end configured to be coupled to an engine crankshaft; and,
- a locking device configured to lock said first part in at least two positions along said axis.

9. A length-adjustable connecting rod, comprising:
- a first portion adapted for coupling to a piston of an internal combustion engine; and
- a second portion adapted for coupling to a crankshaft of the internal combustion engine, such second portion being slidably coupled to the first portion along a longitudinal axis, one of such second portion and first portion having a chamber for receiving a portion of the other one of such second portion and first portion being disposed within a chamber thereof;
- a locking device configured to lock the first portion to the second portion in a selected one of at least two positions, such positions being laterally spaced along the longitudinal axis; and
- wherein said locking device comprises:
  - a pin positioned transverse to the longitudinal axis, such pin being carried by the one of the second portion and first portion disposed within the chamber;
  - a recess disposed in a wall portion of the chamber, such recess being adapted to receive the pin when the pin is axially aligned with the recess.

10. The rod recited in claim 9 wherein the locking device includes a spring, such spring being configured to urge the pin into the recess when the pin is axially aligned with the recess.

11. The rod recited in claim 9 wherein the locking device comprises:
- at least one second pin positioned transverse to the longitudinal axis, such second pin being carried by the one of such second portion and first portion disposed within the chamber, such second pin being spaced from the first-mentioned pin a predetermined first distance along the longitudinal axis;
- a second recess disposed in the wall portion of the chamber, such second recess being adapted to receive the second pin when the second pin is axially aligned with the second recess, such second recess being laterally spaced from the first-mentioned recess a second predetermined distance along the longitudinal axis.

12. The rod recited in claim 11 wherein the locking device includes a second spring, such second spring being configured to urge the second pin into the second recess when the second pin is axially aligned with the second recess.

13. The rod recited in claim 12 wherein the first predetermined distance is different from the second predetermined distance.

* * * * *